United States Patent [19]
Ohashi et al.

[11] Patent Number: 4,866,705
[45] Date of Patent: Sep. 12, 1989

[54] DATA TRANSMISSION SYSTEM WITH MEANS FOR DISTRIBUTING COLLISION SIGNALS VIA THE TRANSMISSION LINE

[75] Inventors: Masakazu Ohashi, Otokuni; Michiyuki Horiguchi, Nara; Yoshimitsu Matsui, Kashihara, all of Japan

[73] Assignee: Sharp Kabushiki Kaisha, Osaka, Japan

[21] Appl. No.: 518,456

[22] Filed: Jul. 29, 1983

[30] Foreign Application Priority Data

Jul. 29, 1982 [JP] Japan .................. 57-134196

[51] Int. Cl.[4] .............................................. H04J 3/02
[52] U.S. Cl. ................................. 370/85.2; 340/825.5
[58] Field of Search ........................... 370/85, 94, 89; 340/825.5

[56] References Cited
U.S. PATENT DOCUMENTS 4,063,220 12/1977 Metcalfe et al. ................. 340/825.5
4,234,952 11/1980 Gable et al. ............................ 370/85
4,366,480 12/1982 Van Hatten .......................... 370/85
4,398,298 8/1983 Van Egmond et al. ............... 370/85
4,412,326 10/1983 Limb ..................................... 370/85
4,432,088 2/1984 Frankel ................................. 370/85
4,463,351 7/1984 Chiarottino .......................... 370/85

Primary Examiner—Douglas W. Olms
Attorney, Agent, or Firm—Birch, Stewart, Kolasch & Birch

[57] ABSTRACT

The disclosure is directed to a data transmission system capable of transmitting any desired data between a plurality of terminal units connected to each other for transmitting and receiving a variety of data wherein it is characterized in that; as soon as one of these terminal units first detects a signal collision, the relevant collision signal is instantly sent to the transmission line, thus enabling all other units to correctly detect such a collision, and as a result, an overall system capability for correctly detecting any collision occurring in the transmission line can be improved significantly, resulting in the minimized error throughout data transmission operations.

3 Claims, 2 Drawing Sheets

DATA TRANSMISSION SYSTEM WITH MEANS FOR DISTRIBUTING COLLISION SIGNALS VIA THE TRANSMISSION LINE

BACKGROUND OF THE INVENTION

The present invention relates to a data transmission system, more particularly, to a data transmission system capable of transmitting a variety of data between each of a plurality of terminal units which transmit and receive such data via a plurality of transmission lines connected thereto.

When a plurality of terminal units are connected to a transmission line while data transmission is performed between two of them, a certain signal is given to the remaining terminal units, informing them that the data transmission line is engaged, and as a result, except for these two units, no request for using the transmission line can be generated by the remaining units.

Conversely, if a plurality of terminal units simultaneously request any available transmission line and permission for using a transmission line is simultaneously given to a plurality of terminal units, it will result in a confusion in transmitting a variety of data, causing them to be incorrectly transmitted. To prevent this, conventional data transmitters apply means, which, on request of any terminal unit for using a transmission line and upon detecting an additional request for any available transmission line from another terminal unit at the same time, allows the controller to output an encoded bit sequence signal so that the terminal unit requesting the line can detect the presence of such an additional request (hereinafter such a request is referred to as a collision), thus resulting in the improved capability for correctly detecting such a collision in the transmission line. Nevertheless, with any of the conventional data transmitters, a complex circuitry has to be used for properly generating such a bit sequence signal, and in addition, due to a need for providing a software operation circuit, as a whole, such conventional data transmission systems are found disadvantageous for use with their complex structures and due to relatively higher cost.

OBJECT AND SUMMARY OF THE INVENTION

In the light of these disadvantages, the present invention primarily aims at providing a data transmission system capable of unmistakably detecting any possible collision by using a simplified system structure throughout every terminal unit.

Briefly speaking, the present invention provides a data transmission system comprising a plurality of terminal units that can mutually transmit and receive data signals via the, transmission line connected thereto, where said data transmission system characteristically comprises transmission control means outputting a variety of data, means for detecting such a request for any available transmission line, and means for generating a collision signal informing that a plurality of the terminal units have actually requested for any available transmission line at the same time in vying with others in responding to a request for any available line detected from any other terminal units as soon as such a detecting means has detected such a request.

According to the preferred embodiment of the present invention, as soon as one of the terminal units first detects any collision of request signals, this collision signal is immediately output to the transmission line, thereby enabling all other terminal units to correctly detect such a collision, and as a result, it will result in the improved capability in detecting any collision on the transmission line. Consequently, it minimizes incorrect data transmission. The preferred embodiment of the present invention eliminates any special circuitry and software needed for any of the conventional transmission systems. Using a simplified structure, intended objects can be satisfactorily achieved.

Primary object thus described and other objects of the present invention will be further clarified by the detailed description of the invention in reference to the drawings attached hereto.

DETAILED DESCRIPTION OF THE INVENTION

Figure 1:
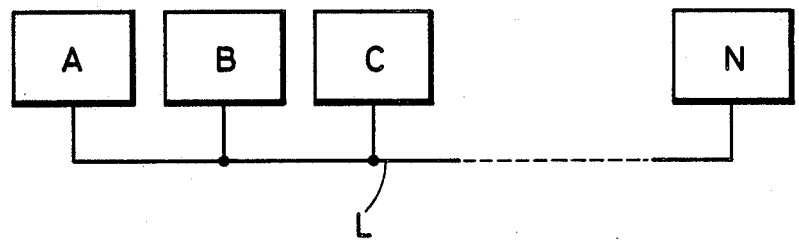
FIG. 1 shows a simplified diagram of a data transmission system as a preferred embodiment of the present invention.
Figure 2:
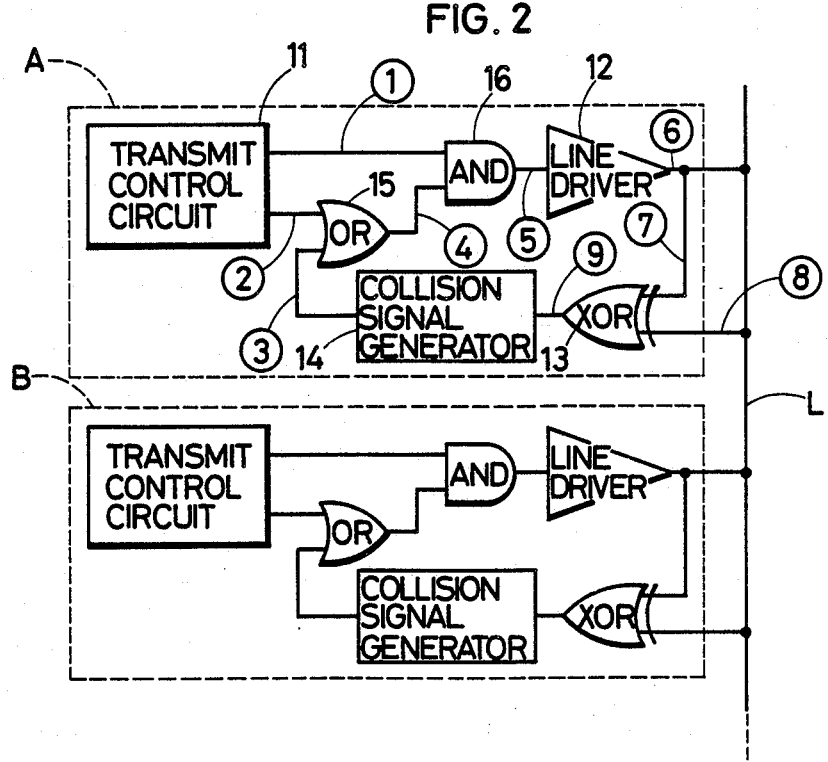
FIG. 2 shows a simplified block diagram of the circuitry of terminal units constituting a data transmission system shown in FIG. 1.

FIG. 1 shows a simplified diagram of a data transmission system as a preferred embodiment of the present invention. A plurality of terminal units A through N each incorporating functions for transmitting and receiving data signals are connected to a transmission line L. Each of these terminal units connected to the transmission line L does not have any unit which is synchronized with a link controller, while such a data transmission system embodied by the present invention is composed so that any data can be transmitted and received by each of these terminal units selected at random. FIG. 2 shows a simplified block diagram of the circuitry of terminals constituting a data transmission system shown in FIG. 1.

Figure 3:
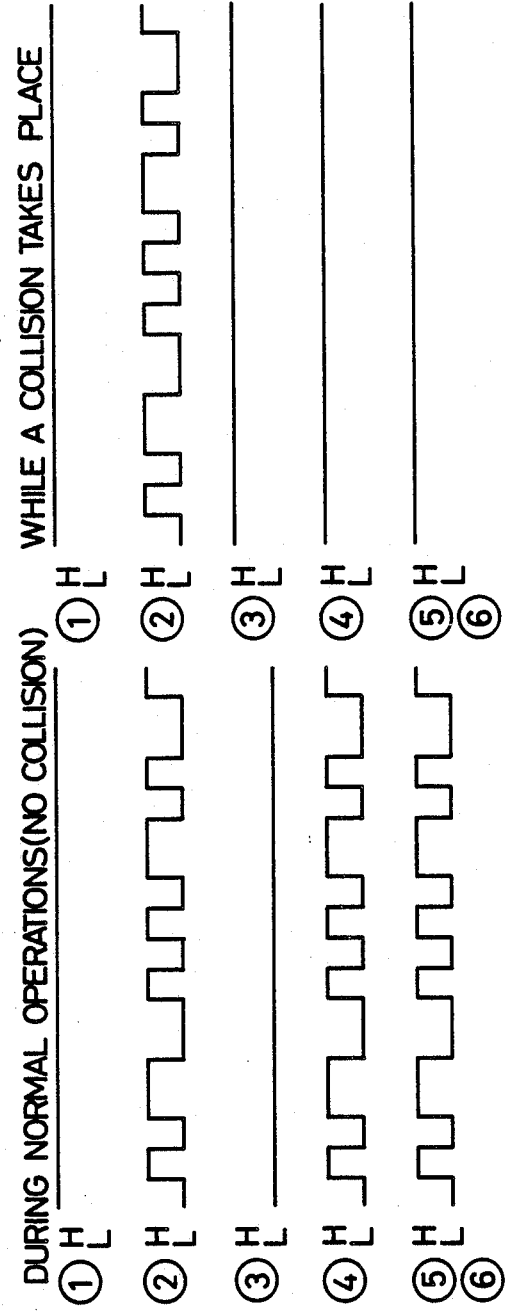
FIG. 3 shows a time chart of the signal levels appearing in respective signals lines of the block diagram shown in FIG. 2, representing status during the normal mode and when a collision has taken place, and FIG. 4 also shows a time chart of the signal levels appearing in respective signal lines of the block diagram shown in FIG. 2.

As shown in FIG. 2, each of the terminal units incorporates a transmission control circuit 11 that outputs all the transmission data, a line driver 12 amplifying all the data signals so that they can be output in an optimum condition, an XOR gate 13 that detects any collision, a collision signal generating circuit 14 that generates a collision signal in responding to an output from said XOR gate 13 as soon as it detects any collision, an OR gate 15 and an AND gate 16 allowing the output data to be properly output from said transmission control circuit 11 and collision signal generating circuit 14. FIG. 3 shows a time chart representing variable signal levels in the signal lines 1 through 6 of the terminal unit A shown in FIG. 2. In reference to FIGS. 2 and 3, operations of the data transmission system embodied by the present invention is described below.

If any desired data should be output from the terminal unit A to the transmission line L, the transmission control circuit 11 in the terminal unit 1 continuously outputs high signals (for example, "1") to one of the terminals of AND gate 16 via the signal line 1, as shown in the normal operation time chart (1) of FIG. 3. As a result, AND gate 16 enters an operative condition as soon as the other terminal receives a signal. Next, a transmission line requesting a signal (shown by symbol 2 of the normal operation time chart) representing an address code typical of the terminal unit A is output from the other terminal of the transmission control circuit 11 to one of the input terminals of OR gate 15 via the signal line (2). During this period, as shown in the normal operation time chart (3), the other input terminal of OR gate 15 constantly receives low signals (for example, "0"), whereas a transmission line requesting such a signal characteristic of the terminal unit A is output from OR gate 15 to AND gate 16, as shown in the normal operation time chart (4). Since AND gate 16 constantly receives high signals via the signal line 1 as described earlier, such a transmission line requesting signal fed via the signal line 4 becomes an output signal from AND gate 16. As shown by symbol 5 of the normal operation time chart of FIG. 3, such a transmission line requesting signal is output from AND gate 16. This signal is then amplified by the line driver 12 before being sent out to the transmission line L via the signal line 8.

XOR gate 13 provides two input terminals, each of which receives all the transmission line requesting signals sent from the line driver 12 via the signal lines 6 and 7 and also via the transmission line L and the signal line 8, and so all the signals entering XOR gate 13 are the transmission line requesting signals characteristic of the terminal A, whereas all the signals from XOR gate 13 to the signal lines are of the low-level, for example, "0". As a result, no collision signal can be generated by the collision signal generating circuit 14, thus causing only the low-level signal "0" to constantly appear at the signal line 3.

Figure 4:
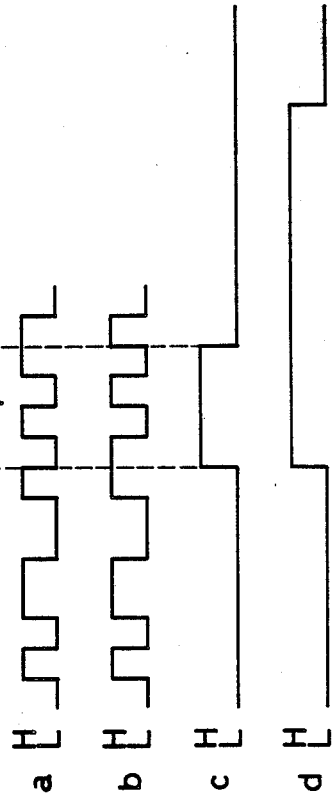

Next, a consideration is given to such a case if both the terminal units A and B simultaneously output a signal requesting the transmission line L. FIG. 4-a represents a transmission line requesting signal characteristic of the terminal unit A, whereas FIG. 4-b represents a transmission line requesting signal characteristic of the terminal unit B. In this case, the terminal unit A shown in FIG. 2 outputs a line requesting signal represented by FIG. 4-a, whereas the terminal unit B outputs a line requesting signal represented by FIG. 4-b to the transmission line L. Actual indications are found as follows. A transmission line requesting signal typical of the terminal unit A shown in FIG. 4-a appears at the signal line 7, which is then fed to one of the terminals of XOR gate 13. Likewise, the other transmission line requesting signal typical of the terminal unit B, which was sent from said terminal unit B to the transmission line L, then appears at the signal line 8, which exactly corresponds to the signal represented by FIG. 4-b. This signal is then fed to the other input terminal of XOR Gate 13.

Now, as shown in FIG. 4-a and b, said transmission requesting signals being characteristic of the terminal units A and B respectively contain such signal component being different from each other during the period T, and as a result, a signal that will become a high signal "1" during said period T appears at the signal output line 9 of XOR gate 13, as shown in FIG. 4-c, where said signal line 9 represents FIG. 4-a and 4-b as the exclusive logic sum output. In responding to the signal that appeared at the signal line 9, the collision signal generating circuit 14 generates a collision signal for a predetermined period of time as soon as said period T is entered. Such a collision signal will become a high signal "1" for a specific period of time, as shown in FIG. 4-d. In other words, a high signal "1" constantly appears at the signal line 3 shown in FIG. 2, and as a result, an output from OR gate 15 becomes constant high signals irrespective of the signal level from the signal line 2, and such high signals are eventually transmitted to the transmission line L via AND gate 16, line driver 12, and the signal line 6.

Time chart shown in FIG. 3 represents levels of the collided signals in the signal lines 1 through 6. Signals appearing at transmission line L constantly go high. Since such a signal appearing at the transmission line L is different in nature from said transmission requesting signals characteristic of these terminal units, these units can effectively detect any collision as can be done so by the terminal unit A. In other words, as soon as transmission line requesting signals have been output simultaneously from a plurality of terminal units, one of these units that has initially detected such a collision then outputs collision detect signals, i.e., constantly high signals to the transmission line. As a result, even if any other terminal unit has erroneously missed such a collision signal due to incompatibility of the line requesting signals sent from respective terminal units, such a terminal unit that has initially detected the collision can effectively output a collision detect signal. Since such a collision signal constantly remains high contrary to the line requesting signals inherent to respective terminal units, all other terminal units can also detect the collision instantly. Consequently, such an effective system as described above significantly improves an overall collision detection capability throughout the entire data transmission system.

The present invention thus described in reference to the annexed drawings will obviously be suggestive of any derivation or modification from the spirit and scope contained therein by those skilled in the arts. It should be understood, however, that the present invention is not limitative of the spirit and scope described above, but is solely inclusive of such derivations and/or modifications within the spirit and scope of the following claims.

What is claimed is:

1. A data transmission system connected to a plurality of terminal units each capable of transmitting and receiving data to and from a transmission line wherein each of the connected terminal units comprises:

control means for transmitting a variety of data from the associated terminal unit to the transmission line and a request signal requesting use of said transmission line, said request signal including data which identifies the terminal unit requesting use of the transmission line;

detector means for sensing the output of said request signal from the control means of the associated terminal unit and the presence of any such request signal in the transmission line;

comparator means for determining if the request signal output from said control means contains different identifying data from the request signal present in said transmission line;

means for generating a collision signal when said different identifying data is identified by said comparator means, said collision signal being a continuous signal of a constant level for an extended period of time which is readily and rapidly distinguishable for many of said request signals by the comparator means of each terminal unit; and means for immediately applying said collision signal to said transmission line.

2. A data transmission system according to claim 1 wherein said detector means includes a first signal line connected to an output circuit of said control means and a second signal line connected to said transmission line.

3. A data transmission system according to claim 2 wherein said comparator means comprises an exclusive OR gate with input terminals connected to said first and second signal lines.

* * * * *